United States Patent
Strandjord et al.

(10) Patent No.: US 9,683,846 B2
(45) Date of Patent: Jun. 20, 2017

(54) RESONATOR FIBER OPTIC GYROSCOPE RESONANCE DETECTION DEMODULATOR REFERENCE PHASE CORRECTOR

(71) Applicant: Honeywell International Inc., Morris Plains, NJ (US)

(72) Inventors: Lee K. Strandjord, Tonka Bay, MN (US); Waymon Ho, Glendale, AZ (US); Chuck Croker, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/949,552

(22) Filed: Nov. 23, 2015

(65) Prior Publication Data

US 2017/0146346 A1 May 25, 2017

(51) Int. Cl.
*G01C 19/72* (2006.01)

(52) U.S. Cl.
CPC ......... *G01C 19/727* (2013.01); *G01C 19/721* (2013.01)

(58) Field of Classification Search
CPC ........ G01C 19/00; G01C 19/72; G01C 19/66; G01C 19/662; G01C 19/664
USPC ................................. 356/459, 472, 473, 475
See application file for complete search history.

(56) References Cited

U.S. PATENT DOCUMENTS

| | | | |
|---|---|---|---|
| 5,459,575 A | 10/1995 | Malvern | |
| 6,046,810 A * | 4/2000 | Sanders | G01C 19/72 356/459 |
| 6,396,881 B1 | 5/2002 | White | |
| 7,079,780 B1 | 7/2006 | Rollins | |
| 7,855,789 B2 | 12/2010 | Strandjord et al. | |
| 8,699,034 B2 | 4/2014 | Strandjord et al. | |
| 2011/0141477 A1* | 6/2011 | Sanders | G01C 19/727 356/461 |

FOREIGN PATENT DOCUMENTS

| EP | 2759803 | 7/2014 |
|---|---|---|
| EP | 2813815 | 12/2014 |

OTHER PUBLICATIONS

European Patent Office, "Extended European Search Report from EP Application No. 16189805.1 mailed Apr. 28, 2017", "from Foreign Counterpart of U.S. Appl. No. 14/949,552", Apr. 28, 2017, pp. 1-9, Published in: EP.

* cited by examiner

*Primary Examiner* — Jonathan Hansen
(74) *Attorney, Agent, or Firm* — Fogg & Powers LLC

(57) ABSTRACT

A RFOG, comprising: a master laser emitting a reference optical signal; first and second slave lasers emitting first and second optical signals; an optical resonator ring cavity coupled to the lasers, the first and second optical signals propagating in first and second directions through the optical resonator ring cavity; one or more signal generators to inject first and second modulation signals at first and second frequencies on both optical signals; first and second photodetectors that generate first and second signals; first and second demodulators to demodulate the first and second signals using first and second reference signals and the first and second frequencies; a differencing function to output the difference between resonance frequencies of the first and second signals; at least a third demodulator to detect reference phase errors; and at least one phase servo to adjust the phase of at least one of the first and second reference signals.

20 Claims, 6 Drawing Sheets

RESONATOR FIBER OPTIC GYROSCOPE RESONANCE DETECTION DEMODULATOR REFERENCE PHASE CORRECTOR

STATEMENT REGARDING FEDERALLY SPONSORED RESEARCH OR DEVELOPMENT

This invention was made with Government support under HR0011-08-C-0019 awarded by DARPA. The Government has certain rights in the invention.

BACKGROUND

A resonator fiber optic gyroscope (RFOG) senses rotation rate by detecting the difference in clockwise (CW) and counter-clockwise (CCW) resonance frequencies of an optical fiber ring resonator. The RFOG shows promise to meet the needs of many navigation and inertial stabilization markets. The resonance frequencies are detected by probing the ring resonator with frequency or phase modulated laser light. When the average laser frequency is on resonance, the resonator output signal at the modulation frequency will ideally be zero. If the laser frequency slightly deviates from the resonance frequency, the resonator output will have a nonzero signal amplitude at the modulation frequency. The sign of the signal relative to the modulation depends on which side of resonance the laser frequency has deviated. To detect deviations in laser frequency relative to the resonance frequency, phase sensitive demodulation is employed.

SUMMARY

The embodiments of the present disclosure provide systems and methods for reducing common modulation errors for a resonator fiber optic gyroscope (RFOG) and will be understood by reading and studying the following specification.

In one embodiment, a resonator fiber optic gyroscope (RFOG) comprises a master laser configured to emit a reference optical signal; a first slave laser configured to emit a first optical signal, and a second slave laser configured to emit a second optical signal. The RFOG also includes an optical resonator ring cavity coupled to the master laser, first slave laser, and second slave laser, wherein the first optical signal propagates in a first direction through the optical resonator ring cavity, and the second optical signal propagates in a second direction through the optical resonator ring cavity. The RFOG also includes one or more signal generators configured to inject a first modulation signal at a first frequency and second modulation signal at a second frequency on both the first optical signal and the second optical signal. The RFOG also includes a first photodetector that generates a first signal corresponding to the first optical signal based on a signal exiting the optical resonator ring cavity at a first transmission port, and a second photodetector that generates a second signal corresponding to the second optical signal based on a signal exiting the optical resonator ring cavity at a second transmission port. The RFOG also includes a first demodulator configured to demodulate the first signal in phase with a first reference signal and at the first frequency to produce a first demodulated signal, and a second demodulator configured to demodulate the second signal in phase with a second reference signal and at the first frequency to produce a second demodulated signal, wherein the first reference signal and the second reference signal are derived from the first modulation signal. The RFOG also includes a differencing function configured to output the difference between resonance frequencies of the first signal and the second signal based on the first demodulated signal and the second demodulated signal. The RFOG also includes at least a third demodulator configured to detect a reference phase error, and at least one phase servo electronics module configured to adjust the phase of at least one of the first reference signal and the second reference signal based on the detected reference phase error.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
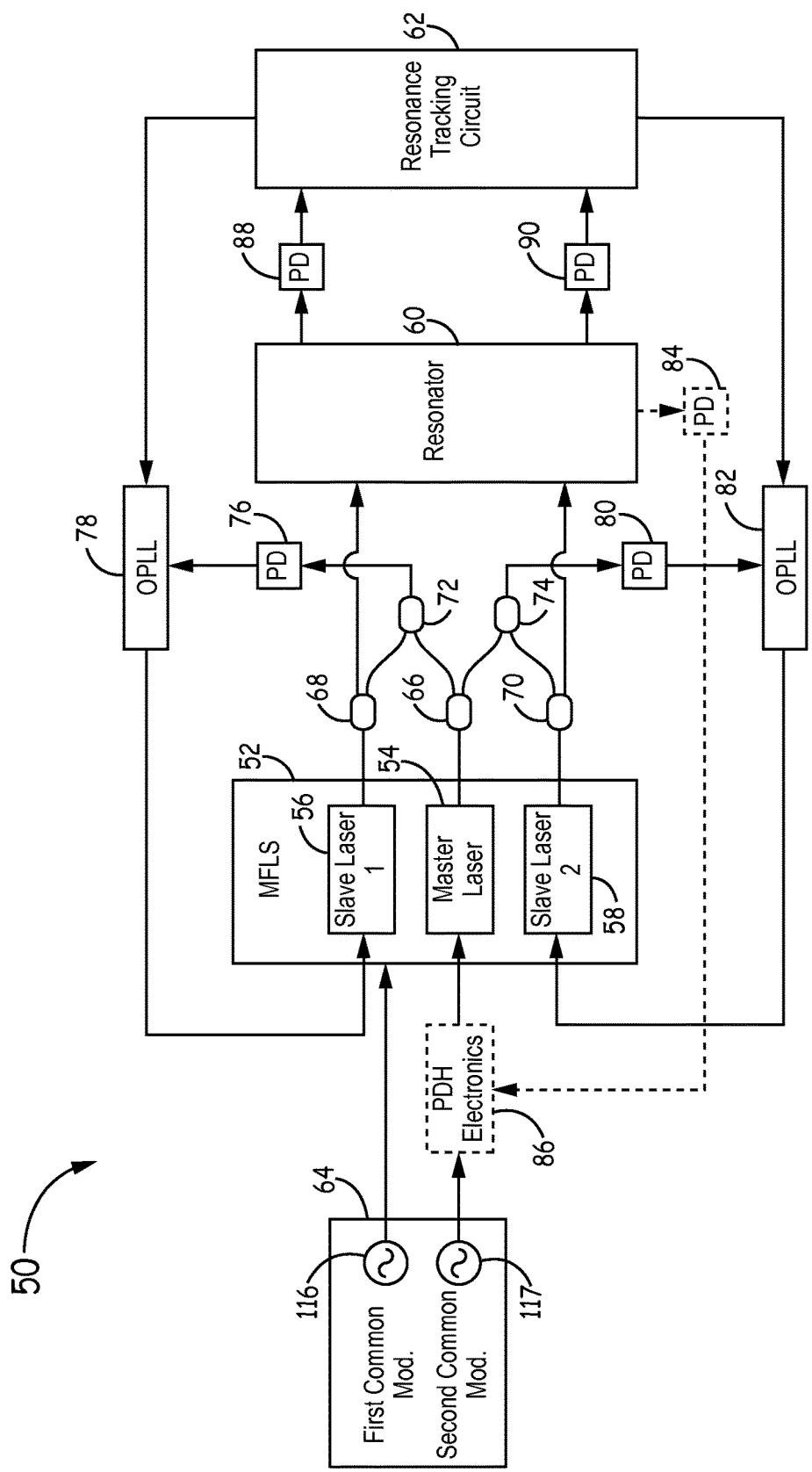
FIG. 1 is a block diagram of an example resonator fiber optic gyroscope according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Some modulation imperfections can produce an error in the detection of the ring resonator resonance frequencies, which can result in a rotation sensing error if the resonance detection errors are different between the CW and CCW directions. Amplitude modulation on the light at the same frequency as the modulation can produce resonance detection errors. Harmonic distortion of the frequency or phase modulation at even harmonics of the modulation frequency can also produce these errors. The majority of the signal error generated by these error sources is rejected by a phase sensitive demodulator because the signal error is typically 90 degrees out of phase with the primary resonance detection signals. However, the reference signal provided to the phase detection demodulator and the primary resonance detection signals pass through different electrical paths and the reference signal does not pass through any optical paths.

Some elements (e.g. low pass filters) in these paths will introduce phase shifts in the signals. Since the components will have some sensitivity to temperature, the phase shifts will be sensitive to temperature, and thus the rejection of the errors at the phase sensitive demodulator will be sensitive to temperature. This leads to a rotation sensing error that is sensitive to temperature and other drift in the components. There is a need to detect when the demodulator reference phase has deviated from optimum rejection of these errors and then control the reference phase to maintain an optimum rejection of these errors.

The embodiments described herein include systems and methods for reducing common modulation errors for a resonator fiber optic gyroscope (RFOG). The embodiments described herein include application of a second common modulation signal to detect harmonic distortion and amplitude modulation errors on a first common modulation signal used for resonance tracking. The second common modulation is applied at a particular frequency. The embodiments described herein include one or more demodulators to detect the second common modulation signal and one or more servo electronics modules to adjust phases of the reference signals to reduce error.

FIG. 1 illustrates an example RFOG 50 according to one embodiment of the present disclosure. RFOG 50 includes a master laser 54, a first slave laser 56, a second slave laser 58, a resonator 60, a resonance tracking circuit 62, and at least one signal generator 64. In one embodiment, the resonator 60 can include a fiber optic coil that is wound around a core and one or more optical couplers or mirrors. The slave lasers 56, 58 are in optical communication with the resonator 60.

In exemplary embodiments, the lasers 54, 56, 58 are generated by a multi-frequency laser source (MFLS) 52. In exemplary embodiments, the first slave laser 56 can be configured to generate the CCW optical signal and the second slave laser 58 can be configured to generate the CW optical signal.

In exemplary embodiments, the slave lasers 56, 58 are phase-locked to the master laser using optical phase look loop (OPLL) electronics 78, 82. In such embodiments, the reference optical signal of the master laser 54 is split at beam splitter 66. The output beam of the first slave laser 56 is split at beam splitter 68. The output beam of the second slave laser 58 is split at beam splitter 70. A portion of the reference optical signal is combined with a portion of the output beam of the first slave laser 56 at combiner 72. The output of combiner 72 is provided to a photodetector 76, and the output of the photodetector 76 is provided to OPLL electronics 78. The OPLL electronics 78 also receive input from the resonance tracking circuit 62. In exemplary embodiments, the OPLL electronics 78 receive a first local oscillator (L.O.) signal from the resonance tracking circuit 62. A portion of the reference optical signal is also coupled with a portion of the output beam of the second slave laser 58 at combiner 74. The output of combiner 74 is provided to a photodetector 80, and the output of the photodetector 80 is provided to OPLL electronics 82. The OPLL electronics 82 also receive input from the resonance tracking circuit 62. In exemplary embodiments, the OPLL electronics 82 receive a second local oscillator (L.O.) signal from the resonance tracking circuit 62. In exemplary embodiments, the combiners 72, 74 can include a fiber optic coupler, mirrors on a silicon optical bench, an optical combiner on a silicon optics chip, or the like.

In some embodiments, RFOG 50 also optionally includes another photodetector 84 coupled to a reflection port of the resonator 60, where a majority of the light from the reflection port does not circulate through the resonator 60. In such embodiments, RFOG 50 also optionally includes Pound-Drever-Hall (PDH) electronics 86 coupled to the master laser. Use of PDH electronics is discussed in detail in U.S. Pat. No. 8,923,352, which is hereby incorporated by reference. The specifics of PDH electronics 86 will be discussed herein with respect to FIGS. 2 and 2A.

In some embodiments, the CW optical signal and the CCW optical signal optionally have unique modulations applied to them prior to entering the resonator 60 (not shown). In particular, a first sideband heterodyne (SHD) modulation is applied to the CW optical signal at a first frequency and a second SHD modulation is applied to the CCW optical signal at a second frequency. In exemplary embodiments, the first frequency and the second frequency are in the megahertz range of frequencies and correspond to resonance frequencies of the resonator 60. SHD modulations are discussed in U.S. Pat. No. 9,115,994, which is hereby incorporated by reference.

In order to track whether the lasers 56, 58 are on resonance, a first common modulation signal 116 is injected on both the CW optical signal and the CCW optical signal by the at least one signal generator 64. The first common modulation signal 116 has a third frequency and is injected prior to the CW and CCW optical signals entering the resonator 60. In exemplary embodiments, the third frequency can range from 5 kHz to 100 kHz depending on the application. For example, the third frequency could be 7 kHz. The modulated CW and CCW optical signals circulate in the resonator 60 and are directed from first and second transmission ports to respective photodetectors 88, 90, which generate first and second transmission signals corresponding to the modulated CW and CCW optical signals respectively for processing.

Figure 2:
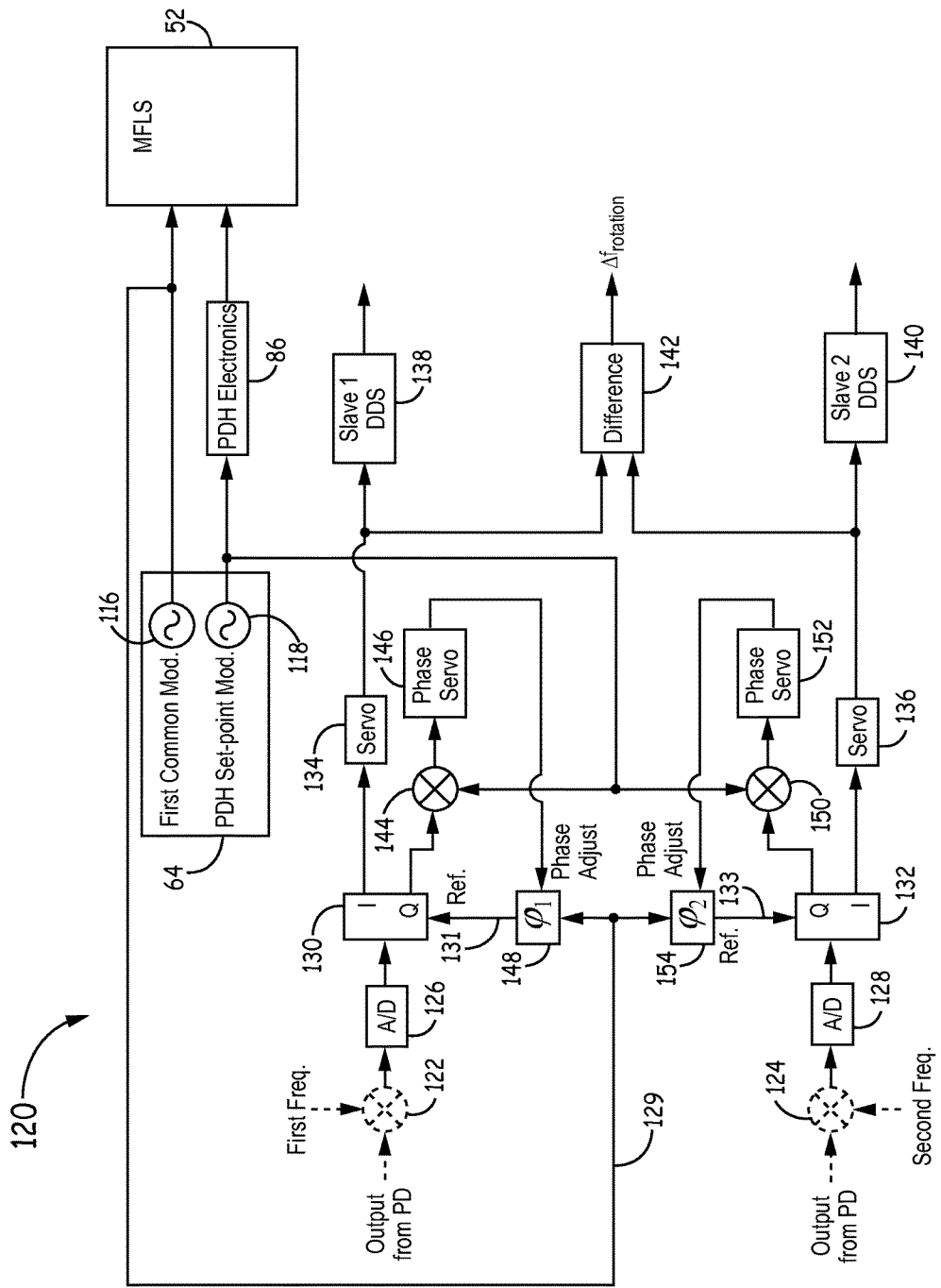
FIG. 2 is a block diagram of an example resonance tracking circuit according to one embodiment of the present disclosure.

The first and second transmission signals are processed in parallel paths in the resonance tracking circuit 62. FIG. 2 is a block diagram of one example embodiment of a resonance tracking circuit 120. In exemplary embodiments including the SHD modulation, the transmission signals generated by the photodetectors 88, 90 are demodulated at the first and second frequencies respectively. The first transmission signal is demodulated at the first frequency by a first demodulator 122 to produce a first demodulated signal. The second transmission signal is demodulated at the second frequency by a second demodulator 124 to produce a second demodulated signal. In exemplary embodiments, the first and second demodulators 122, 124 are analog mixers. The first demodulated signal is digitized at the analog-to-digital (A/D) converter 126 and the second demodulated signal is digitized at the A/D converter 128. In other embodiments, the first transmission signal and the second transmission signal can be digitized prior to the demodulation at the first and second demodulators 122, 124. In such embodiments, the first and second demodulators 122, 124 are implemented digitally.

In embodiments not including SHD modulation, the first transmission signal is digitized at the analog-to-digital (A/D) converter 126 to produce a first digitized signal and the second transmission signal is digitized at the A/D converter 128 to produce a second digitized signal.

The first digitized signal is demodulated by a third demodulator 130 in phase with a first reference signal 131 and at the third frequency to produce a third demodulated signal. The second digitized signal is demodulated by a fourth demodulator 132 in phase with a second reference signal 133 and at the third frequency to produce a fourth demodulated signal. In exemplary embodiments, the third and fourth demodulators 130, 132 comprise a digital multiplier that multiplies the input signal by a digital sine wave reference signal. In other embodiments, the third and fourth demodulators 130, 132 comprise a digital multiplier that multiplies the input signal by a square wave reference signal with unity amplitude, which can be accomplished by changing the input signal sign bit with a digital reference signal. The third demodulated signal and the fourth demodulated signal comprise resonance tracking error signals. In particular, the third demodulated signal indicates that the first slave laser has drifted from resonance center and the fourth demodulated signal indicates that the second slave laser has drifted from resonance center.

As discussed above with respect to FIG. 1, feedback loops are used to lock the slave lasers 56, 58 onto resonance. In exemplary embodiments, the third demodulated signal is provided to a first servo electronics module (referred to herein as a servo) 134 that controls the output of first direct digital synthesizer (DDS) 138 that provides a first local oscillator (L.O.) signal for the OPLL electronics 78 of first slave laser 56. The DDS 138 controls the optical frequency of the first slave laser 56 by controlling the frequency of the first L.O. signal, which determines the frequency offset between the first slave laser 56 and the master laser 54. The fourth demodulated signal is provided to the second servo 136 that controls the output of a second DDS 140 that provides the second L.O. signal for the OPLL electronics 82 of second slave laser 58. The DDS 140 controls the optical frequency of the second slave laser 58 by controlling the frequency of the second L.O. signal, which determines the frequency offset between the second slave laser 58 and the master laser 54. The resonance tracking circuit 120 also includes a differencing function 142 that receives the signals provided from the first and second servos 134,136 and calculates the rotation rate of the RFOG 50.

Ideally, the first common modulation signal 116 would be a perfect modulation at the third frequency. However, due to imperfections in the components of the RFOG 50, both electrical and optical, there will be some harmonic distortion and amplitude modulation on the first common modulation signal 116. This harmonic distortion and amplitude modulation can cause an unwanted error signal that interferes with the detection of the gyroscope resonator resonance center. In particular, the unwanted error signals can cause a shift in the measured resonance center frequency. This shift can cause the servos 134, 136 to move the slave lasers 56, 58 away from resonance center. Since the rotation rate is determined by differencing the calculated resonance frequencies of the slave lasers 56, 58 and the first common modulation signal 116 is applied to both optical signals, the error caused by the harmonic distortion and amplitude modulation will not be detectable from the measurement of the rotation rate.

The unwanted error signals are typically 90 degrees out of phase with the primary resonance detection signal. Therefore, to eliminate these unwanted error signals from causing the slave lasers 56, 58 to be moved away from resonance center, the third and fourth demodulators 130, 132 are implemented as dual-phase demodulators. In exemplary embodiments, the third and fourth demodulators 130, 132 comprise two multipliers, where one multiplier receives the first reference signal 131 with a first phase and the other multiplier receives the first reference signal 131 with 90 degrees added to the first phase. The reference signals 131, 133 provided to the third and fourth demodulators 130, 132 are derived from a common reference signal 129, which corresponds to the first common modulation signal 116. The output of the third and fourth demodulators 130, 132 will include an in-phase output and a quadrature output. If the reference signals 131, 133 provided to the third and fourth demodulators 130, 132 have an ideal phase, the error caused by the harmonic distortion and amplitude modulation will only appear in the quadrature outputs. Thus, the in-phase output provided to the servos 134, 136 would not include the unwanted error signals. This prevents the harmonic distortion and amplitude modulation from causing the servos 134, 136 to move the slave lasers 56, 58 away from resonance center.

The phase of the reference signals 131, 133 provided to the third and fourth demodulators 130, 132 can be precisely calibrated during the construction of the RFOG 50. However, the common reference signal 129 and the resonator output signals travel through different electrical and optical paths. Accordingly, during operation of the RFOG 50, the phase of common reference signal 129 provided to the third and fourth demodulators 130, 132 will drift from the phase of the first and second transmission signals over time. Further, some of the components of the RFOG 50 will introduce phase shifts that vary with temperature, so the elimination of the unwanted errors caused by the harmonic distortion and amplitude modulation will be sensitive to temperature.

In order to reduce the effects of harmonic distortion and amplitude modulation on the first common modulation signal 116, a second common modulation signal 117 is applied to the CW and CCW optical signals from the slave lasers 56, 58 prior to circulating through the resonator 60. The second common modulation signal 117 is applied at a fourth frequency. In the embodiment shown in FIG. 2, the second common modulation 117 is indirectly applied to the CW and CCW optical signals during operation of the RFOG 50 and comprises a PDH set-point modulation signal 118. The PDH set-point modulation signal 118 is a signal injected into the PDH electronics 86 to move the master laser 54 optical signal slightly off resonance.

Figure 2A:
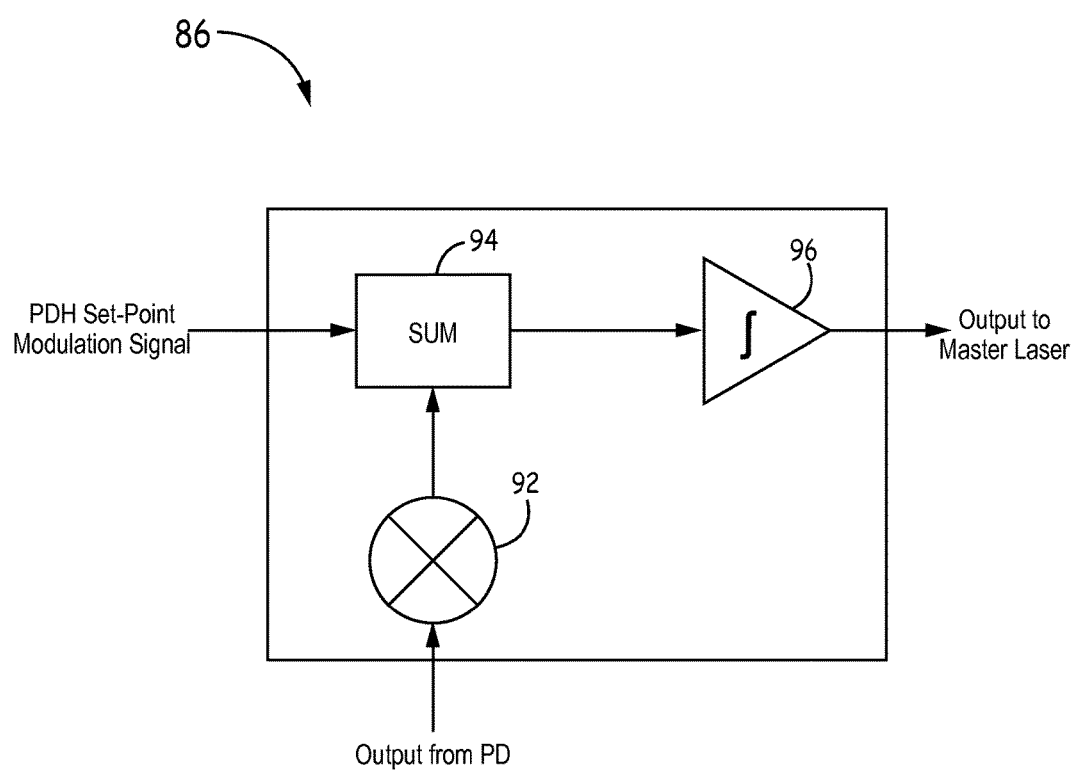
FIG. 2A is a block diagram of example Pound-Drever-Hall electronics according to one embodiment of the present disclosure.

FIG. 2A illustrates example PDH electronics 86 according to one embodiment of the present disclosure. In exemplary embodiments, an analog mixer 92 receives a reflection signal from the photodetector 84 coupled to a reflection output of the resonator 60. A signal is sent from the mixer 92 to a summer 94, which sums the signal from the mixer 92 and the PDH set-point modulation signal 118. The summer outputs a signal to an integrator 96, which outputs a signal to the master laser 54.

In exemplary embodiments, the PDH set-point modulation signal 118 has a frequency that is outside of the gyroscope application band of interest of the RFOG 50 and outside the bandwidth of the loops that lock the slave lasers 56, 58 onto the gyroscope resonator. For example, the fourth frequency could be approximately 1 kHz. In exemplary embodiments, the PDH set-point modulation signal 118 is a sinusoid, so the master laser 54 operates at resonance on average when the PDH set-point modulation signal 118 is applied.

Since the slave lasers 56, 58 follow the master laser 54, the slave lasers 56, 58 will also be moved slightly off resonance when the PDH set-point modulation 118 is applied, as long as the frequency of the PDH set-point modulation 118 is greater than the bandwidth of the loops that lock the slave lasers onto the gyroscope resonator. This will result in a resonance tracking error signal at the in-phase output of the third and fourth demodulators 130, 132. If the phases of the reference signals 131, 133 provided to the third and fourth demodulators 130, 132 are set correctly, none of the resonance tracking error signal should appear in the quadrature output of the third and fourth demodulators 130, 132. In particular, this is a known error on the primary resonance detection signals. Thus, if the resonance tracking error signal appears in the quadrature output of third or fourth demodulator 130, 132, then the phase of reference signal 131, 133 of the respective demodulator 130, 132 is not ideal.

To optimize the phase of the first reference signal 131 provided to the third demodulator 130, the resonance tracking circuit 120 further includes a fifth demodulator 144 coupled to the quadrature output of the third demodulator 130. The fifth demodulator 144 demodulates the quadrature signal at the fourth frequency and in phase with the second common modulation signal to produce a fifth demodulated signal. If a fifth demodulated signal is produced, a reference phase servo 146 provides a correction signal to a first phase adjuster 148 that adjusts the phase of the first reference signal 131 provided to the third demodulator 130. The reference phase servo 146 provides a correction signal to the first phase adjuster 148 to drive the fifth demodulated signal to zero.

To fine tune the phase of the second reference signal 133 provided to the fourth demodulator 132, the resonance tracking circuit 120 further includes a sixth demodulator 150 coupled to the quadrature output of the fourth demodulator 132. The sixth demodulator 150 demodulates the quadrature signal at the fourth frequency and in phase with the second common modulation signal to produce a sixth demodulated signal. If the sixth demodulated signal is produced, a reference phase servo 152 provides a correction signal to a second phase adjuster 154 that adjusts the phase of the second reference signal 133 provided to the fourth demodulator 132. The reference phase servo 152 provides a correction signal to the second phase adjuster 154 to drive the sixth demodulated signal to zero.

When the fifth and sixth demodulated signals are not produced, the phases of the reference signals 131, 133 provided to the third and fourth demodulators 130, 132 are in phase with the first and second transmission signals. Thus, the error produced by harmonic distortion and amplitude modulation is reduced.

Figure 3A:
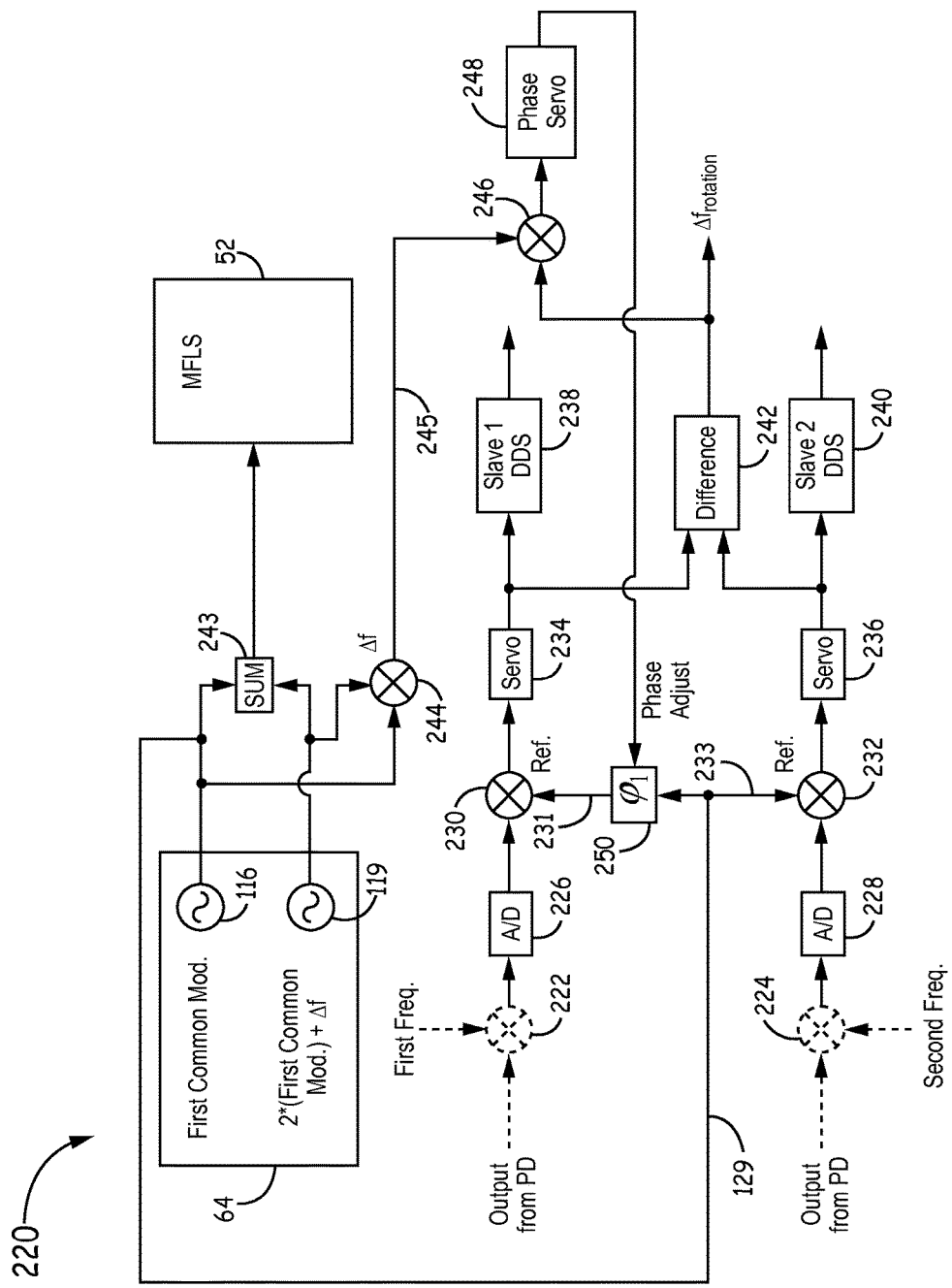
FIG. 3A is a block diagram of an example resonance tracking circuit according to one embodiment of the present disclosure.

FIG. 3A is a block diagram of one example embodiment of an alternative resonance tracking circuit 220. The resonance tracking circuit 220 includes similar components to the resonance tracking circuit 120 discussed above with respect to FIG. 3A. The similar components are labelled with similar reference numerals to those used in FIG. 3A, but with a "2" instead of a "1" as the first digit. Only the differences between resonance tracking circuit 220 and resonance tracking circuit 120 will be discussed.

Instead of injecting a PDH set-point modulation signal 118 for the second common modulation signal 117, a harmonic modulation signal 119 at the second harmonic frequency of the first common modulation signal 116 plus delta-f frequency is used. In exemplary embodiments, the harmonic modulation signal 119 is summed with the first common modulation signal 116 by summer 243 prior to being injected on the first and second optical signals of the slave lasers 56, 58. In exemplary embodiments, delta-f is a frequency of approximately 10 Hz to 100 Hz and within the bandwidth of the loops that lock the slave lasers 56, 58 onto the gyroscope resonator. Delta-f is a frequency offset from the second harmonic frequency of the first common modulation signal 116.

In the embodiment of FIG. 3A, the third and fourth demodulators 230, 232 are single-phase demodulators. If the phase of the first reference signal 231 and the phase of the second reference signal 233 are offset from ideal by the same amount, then the harmonic distortion and amplitude modulation errors will be removed. In particular, when phases of the first and second reference signals 231, 233 are synchronized, common errors (e.g. harmonic distortion and amplitude modulation) should be removed by the differencing the two signals. However, if the phase of the first reference signal 231 is offset from the phase of the second reference signal 233, this will cause an error signal to occur in the output of the difference module 242.

Accordingly, to synchronize the phase of the first reference signal 231 and the phase of the second reference signal 233, the resonance tracking circuit 220 further includes a mixer 244 coupled to at least one signal generator 64. In exemplary embodiments, the mixer can be analog or digital. The mixer 244 multiplies the first common modulation signal 116 and the harmonic modulation signal 119 to obtain the delta-f frequency. The first common modulation signal 116 and the harmonic modulation signal 119 are provided to the mixer 244 from the signal generator 64. The mixer 244 outputs a signal at the delta-f frequency to a fifth demodulator 246 as a third reference signal 245 for the fifth demodulator 246. The fifth demodulator 246 is coupled to the output of the differencing function 242 and demodulates the output signal of the differencing function 242 in phase with the third reference signal 245 and at the delta-f frequency to produce a fifth demodulated signal. If the signal output from the differencing function 242 contains a portion of the harmonic modulation signal 119 with the delta-f frequency, then a fifth demodulated signal will be produced. A single reference phase servo 248 is coupled to the fifth demodulator 246 to provide correction signals to a first reference phase adjuster 250. In exemplary embodiments, the reference phase servo 248 provides a correction signal to a first phase adjuster 250 that adjusts the phase of the first reference signal 231 provided to the third demodulator 230. The reference phase servo 248 provides a correction signal to the first phase adjuster 250 to drive the fifth demodulated signal at the delta-f frequency toward zero. To do so, the first reference phase servo 248 provides correction signal to the phase adjuster 250 to drive the phase of the first reference signal 231 toward the phase of the second reference signal 233.

When the fifth demodulated signal is not produced, the phases of the reference signals 231, 233 provided to the third and fourth demodulators 230, 232 are synchronized. The first and second reference signals 231, 233 may not be in phase with the first and second transmission signals, but the first and second references signals 231, 233 are offset from the ideal phase by the same amount. Thus, the unwanted error produced by harmonic distortion and amplitude modulation is reduced.

Figure 3B:
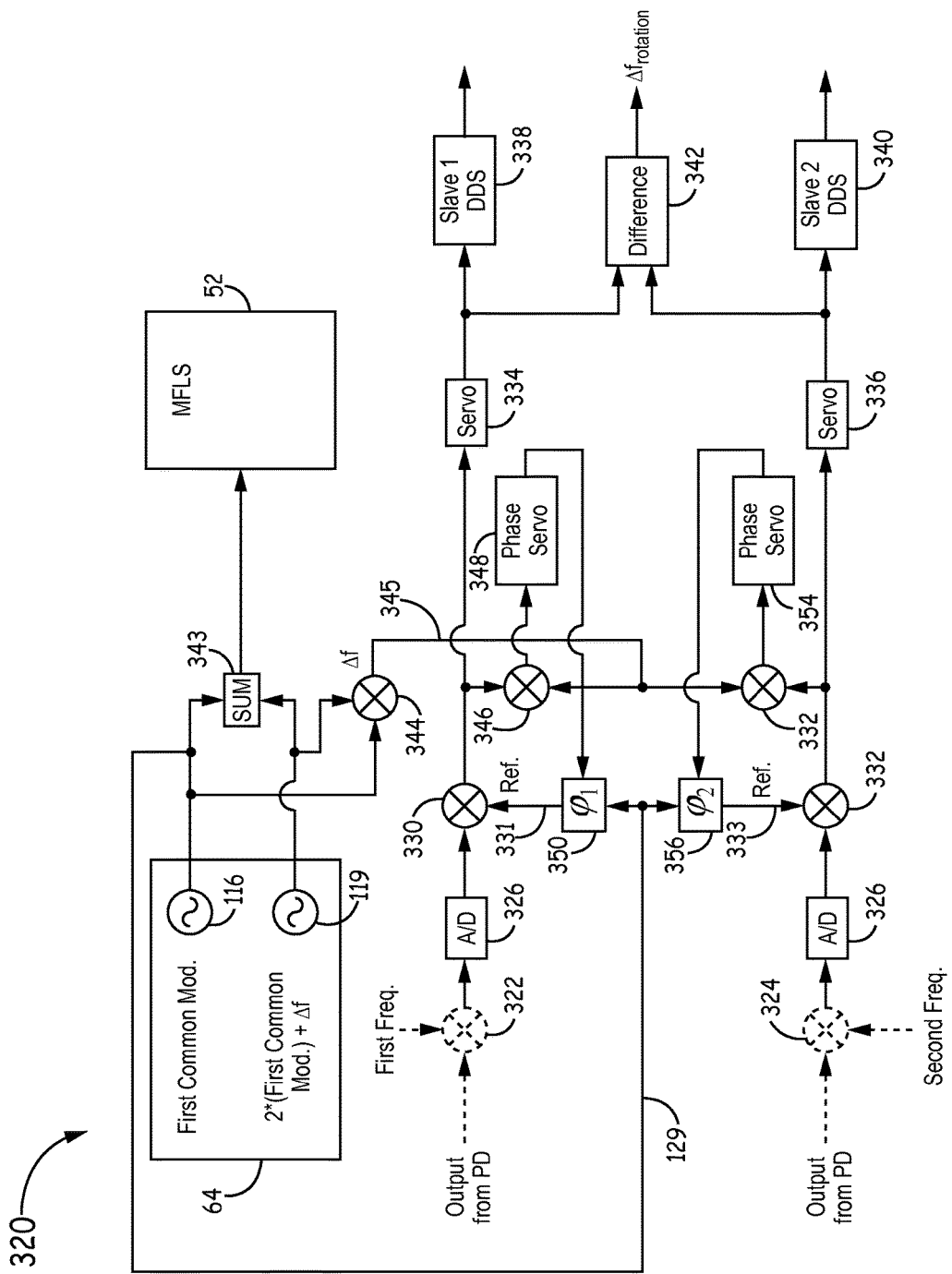
FIG. 3B is a block diagram of an example resonance tracking circuit according to one embodiment of the present disclosure.

FIG. 3B is a block diagram of one example embodiment of an alternative resonance tracking circuit 320. The resonance tracking circuit 320 includes similar components to the resonance tracking circuit 220 discussed above with respect to FIG. 3A. The similar components are labelled with similar reference numerals to those used in FIG. 3A, but with a "3" instead of a "2" as the first digit. Only the differences between resonance tracking circuit 320 and resonance tracking circuit 220 will be discussed.

Resonance tracking circuit 320 includes a fifth demodulator 346 coupled to the output of the third demodulator 330. The fifth demodulator 346 receives the third reference signal 345 at the delta-f frequency output by the mixer 344. The fifth demodulator 346 demodulates the third demodulated signal output by the third demodulator 330 in phase with the third reference signal 345 and at the delta-f frequency to produce a fifth demodulated signal. If the fifth demodulated signal is detected, the first reference phase servo 348 provides a correction signal to a first phase adjuster 350 to adjust the phase of the first reference signal 331 provided to the third demodulator 330. In exemplary embodiments, the first reference phase servo 348 provides a correction signal to the first phase adjuster 350 to drive the fifth demodulated signal toward zero.

Resonance tracking circuit 320 also includes a sixth demodulator 352 coupled to the output of the fourth demodulator 332. The sixth demodulator 352 also receives the third reference signal 345 at the delta-f frequency output by the mixer 344. The sixth demodulator 352 demodulates the fourth demodulated signal output by the fourth demodulator 332 in phase with the third reference signal 345 and at the delta-f frequency to produce a sixth demodulated signal. If a sixth demodulated signal is produced, the second reference phase servo 354 provides a correction signal to a first phase adjuster 356 to adjust the phase of the second reference signal 333 provided to the fourth demodulator 332. In exemplary embodiments, the second reference phase servo 354 provides a correction signal to the phase adjuster 356 to the drive the sixth demodulated signal toward zero.

By adjusting the phase of both the first reference signal 331 and the second reference signal 333, the embodiment of FIG. 3B can drive both the first and second reference signals 331, 333 toward the ideal phase and toward a synchronized phase.

Each of the resonance tracking circuits 120, 220, 320 described above provides a mechanism for removing the effects of harmonic distortion and amplitude modulation on the common modulation signal during RFOG performance. In particular, by injecting and detecting an error signal at a known frequency, the resonance tracking circuits 120, 220, 320 utilize servos to adjust the phase of the reference signals provided to demodulators that are intended to demodulate in phase with the common modulation signal. By removing the effects of harmonic distortion and amplitude modulation, the resonance tracking circuits 120, 220, 320 reduce rotation sensing bias errors and improve the overall performance of the RFOG.

Figure 4:
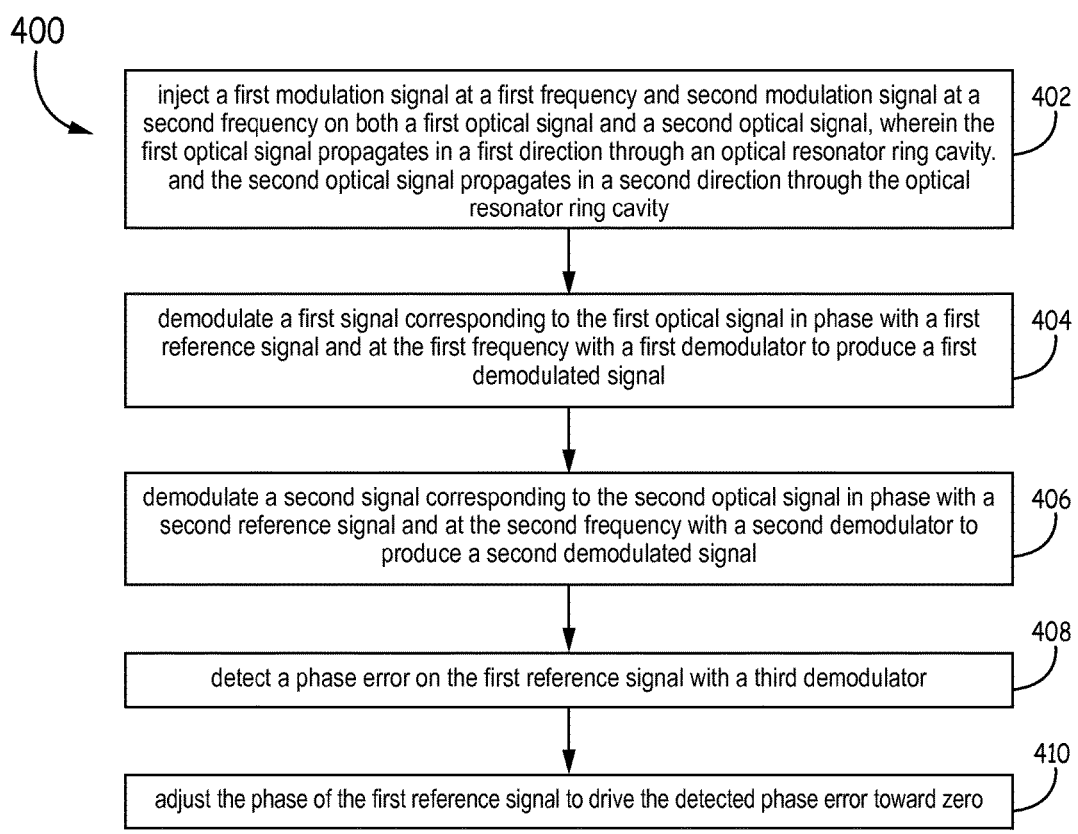
FIG. 4 is an example method of reducing common modulation errors for a RFOG during operation.

FIG. 4 is an example method 400 of reducing common modulation errors for a RFOG during operation according to one embodiment of the present disclosure. In exemplary embodiments, the method 400 can be used for an RFOG, such as RFOG 50 discussed above.

The method 400 begins at 402 with injecting a first modulation signal at a first frequency and second modulation signal at a second frequency on both a first optical signal and a second optical signal, wherein the first optical signal propagates in a first direction through an optical resonator ring cavity, and the second optical signal propagates in a second direction through the optical resonator ring cavity.

The method proceeds to 404 with demodulating a first signal corresponding to the first optical signal in phase with a first reference signal and at the first frequency with a first demodulator to produce a first demodulated signal.

The method proceeds to 406 with demodulating a second signal corresponding to the second optical in phase with a second reference signal and at the first frequency with a second demodulator to produce a second demodulated signal, wherein the first reference signal and the second reference signal are derived from the first modulation signal.

The method proceeds to 408 with detecting a reference phase error with at least a third demodulator and 410 with adjusting the phase of at least one of the first reference signal and the second reference signal to drive the detected reference phase error toward zero.

In exemplary embodiments, detecting a reference phase error with at least a third demodulator includes demodulating a quadrature signal from a quadrature output of the first demodulator with a third demodulator in phase with the second modulation signal and at the second frequency to produce a third demodulated signal. In such embodiments, detecting a reference phase error with at least a third demodulator further includes demodulating a quadrature signal from the quadrature output of the second demodulator with a fourth demodulator in phase with the second modulation signal and at the second frequency to produce a fourth demodulated signal. Such embodiments also include adjusting the phase of the first reference signal with a first phase servo electronics module to drive the third demodulated signal toward zero and adjusting the phase of the second reference signal with a second phase servo electronics module to drive the fourth demodulated signal toward zero.

In other embodiments, the second modulation signal is at a second harmonic frequency of the first modulation signal plus a delta-f frequency. In such embodiments, the method 400 can further include multiplying the first modulation signal and the second modulation signal to produce a third reference signal at the delta-f frequency, wherein the third reference signal at the delta-f frequency is provided to a third demodulator. In such embodiments, detecting a reference phase error with at least the third demodulator includes demodulating an output signal from a differencing function with the third demodulator in phase with the third reference signal and at the delta-f frequency to produce a third demodulated signal. Such embodiments further include adjusting the phase of the first reference signal with a first phase servo electronics module to drive the third demodulated signal toward zero.

In alternative embodiments where the second modulation signal is at a second harmonic frequency of the first modulation signal plus a delta-f frequency, detecting a reference phase error with at least the third demodulator includes demodulating the first demodulated signal with a third demodulator in phase with the third reference signal at the delta-f frequency to produce a third demodulated signal. In such embodiments, detecting a reference phase error with at least the third demodulator also includes demodulating the second demodulated signal with a fourth demodulator in phase with the third reference signal at the delta-f frequency to a produce a fourth demodulated signal. In such embodiments, the method 400 further includes adjusting the phase of the first reference signal with a first phase servo electronics module to drive the third demodulated signal toward zero and adjusting the phase of the second reference signal with a second phase servo electronics module to drive the fourth demodulated signal toward zero.

Example Embodiments

Example 1 includes a resonator fiber optic gyroscope (RFOG), comprising: a master laser configured to emit a reference optical signal; a first slave laser configured to emit a first optical signal; a second slave laser configured to emit a second optical signal; an optical resonator ring cavity coupled to the master laser, first slave laser, and second slave laser, wherein the first optical signal propagates in a first direction through the optical resonator ring cavity, and the second optical signal propagates in a second direction through the optical resonator ring cavity; one or more signal generators configured to inject a first modulation signal at a first frequency and second modulation signal at a second frequency on both the first optical signal and the second optical signal; a first photodetector that generates a first signal corresponding to the first optical signal based on a signal exiting the optical resonator ring cavity at a first transmission port; a second photodetector that generates a second signal corresponding to the second optical signal based on a signal exiting the optical resonator ring cavity at a second transmission port; a first demodulator configured to demodulate the first signal in phase with a first reference signal and at the first frequency to produce a first demodulated signal; a second demodulator configured to demodulate the second signal in phase with a second reference signal and at the first frequency to produce a second demodulated signal, wherein the first reference signal and the second reference signal are derived from the first modulation signal; a differencing function configured to output the difference between resonance frequencies of the first signal and the second signal based on the first demodulated signal and the second demodulated signal; at least a third demodulator configured to detect a reference phase error; and at least one phase servo electronics module configured to adjust the phase of at least one of the first reference signal and the second reference signal based on the detected reference phase error.

Example 2 includes the RFOG of Example 1, further comprising first optical phase lock loop (OPLL) electronics coupled to the first slave laser and second OPLL electronics coupled to the second slave laser, wherein the first slave laser is phase-locked to the master laser using the first OPLL electronics and the second slave laser is phase-locked to the master laser using the second OPLL electronics.

Example 3 includes the RFOG of Example 2, further comprising: a first servo electronics module coupled to the first demodulator, wherein the first servo electronics module controls an output of a first direct digital synthesizer (DDS) that provides a local oscillator signal for the first OPLL electronics; and a second servo electronics module coupled to the second demodulator, wherein the second servo electronics module controls an output of a second DDS that provides a local oscillator signal for the second OPLL electronics.

Example 4 includes the RFOG of Example 3, further comprising: a third photodetector coupled to a reflection port of the resonator; and Pound-Drever-Hall (PDH) electronics coupled to the third photodetector and the master laser, wherein the PDH electronics receive the second modulation signal, wherein the second modulation signal comprises a PDH set-point modulation signal, wherein the PDH electronics applies the PDH set-point modulation signal to the reference optical signal, wherein the PDH set-point modulation signal modulates the reference optical signal at the second frequency.

Example 5 includes the RFOG of Example 4, wherein the second frequency is outside of a measurement band of the RFOG.

Example 6 includes the RFOG of any of Examples 4-5, wherein the first demodulator is a dual-phase demodulator having an in-phase output and a quadrature output, wherein the second demodulator is a dual-phase demodulator having an in-phase output and a quadrature output.

Example 7 includes the RFOG of Example 6, wherein the at least a third demodulator comprises: a third demodulator configured to demodulate a quadrature signal from the quadrature output of the first demodulator at the second frequency to produce a third demodulated signal, wherein the third demodulated signal corresponds to a phase error of the first reference signal; and a fourth demodulator configured to demodulate a quadrature signal from the quadrature output of second demodulator at the second frequency to produce a fourth demodulated signal, wherein the fourth demodulated signal corresponds to a phase error of the second reference signal; wherein the at least one phase servo electronics module comprises: a first phase servo electronics module coupled to the third demodulator, wherein the first phase servo electronics module adjusts the phase of the first reference signal to drive the third demodulated signal toward zero; and a second phase servo electronics module coupled to the fourth demodulator, wherein the second phase servo electronics module adjusts the phase of the second reference signal to drive the fourth demodulated signal toward zero.

Example 8 includes the RFOG of any of Examples 3-7, wherein the second modulation signal comprises a second harmonic frequency of the first modulation signal plus a delta-f frequency, wherein the second modulation signal is summed with the first modulation signal prior to being injected on the first optical signal and the second optical signal.

Example 9 includes the RFOG of Example 8, further comprising a mixer configured to multiply the first modulation signal with the second modulation signal to produce a third reference signal at the delta-f frequency; wherein the at least a third demodulator comprises a third demodulator configured to demodulate a signal output from the differencing function in phase with the third reference signal and at the delta-f frequency to produce a third demodulated signal, wherein the third demodulated signal corresponds to a phase error of the first reference signal; and wherein the at least one phase servo electronics module comprises a first phase servo electronics module coupled to the third demodulator, wherein the first phase servo electronics module adjusts the phase of the first reference signal to drive the third demodulated signal toward zero.

Example 10 includes the RFOG of any of Examples 8-9, further comprising a mixer configured to multiply the first modulation signal and the second modulation signal to produce a third reference signal at the delta-f frequency; wherein the at least a third demodulator comprises: a third demodulator configured to demodulate the first demodulated signal in phase with the third reference signal and at the delta-f frequency to produce a third demodulated signal, wherein the third demodulated signal corresponds to a phase error of the first reference signal; and a fourth demodulator configured to demodulate the second demodulated signal in phase with the third reference signal and at the delta-f frequency to produce a fourth demodulated signal, wherein the fourth demodulated signal corresponds to a phase error of the second reference signal; wherein the at least one phase servo electronics module comprises: a first phase servo electronics module coupled to the third demodulator, wherein the first phase servo electronics module adjusts the phase of the first reference signal to drive the third demodulated signal toward zero; and a second phase servo electronics module coupled to the fourth demodulator, wherein the second phase servo electronics module adjusts the phase of the second reference signal to drive the fourth demodulated signal toward zero.

Example 11 includes a method of reducing common modulation errors for a resonator fiber optic gyroscope (RFOG) during operation, comprising: injecting a first modulation signal at a first frequency and second modulation signal at a second frequency on both the first optical signal and the second optical signal, wherein the first optical signal propagates in a first direction through an optical resonator ring cavity, and the second optical signal propagates in a second direction through the optical resonator ring cavity; demodulating a first signal corresponding to the first optical signal in phase with a first reference signal and at the first frequency with a first demodulator to produce a first demodulated signal; demodulating a second signal corresponding to the second optical in phase with a second reference signal and at the second frequency with a second demodulator to produce a second demodulated signal, wherein the first reference signal and the second reference signal are derived from the first modulation signal; detecting a reference phase error with at least a third demodulator; adjusting the phase of at least one of the first reference signal and the second reference signal to drive the detected reference phase error toward zero.

Example 12 includes the method of Example 11, wherein detecting a reference phase error with at least the third demodulator comprises: demodulating a quadrature signal from a quadrature output of the first demodulator with a third demodulator in phase with the second modulation signal and at the second frequency to produce a third demodulated signal; and demodulating a quadrature signal from a quadrature output of the second demodulator with a fourth demodulator in phase with the second modulation signal and at the second frequency to produce a fourth demodulated signal; wherein adjusting the phase of at least one of the first reference signal and the second reference signal comprises: adjusting the phase of the first reference signal with a first phase servo electronics module to drive the third demodulated signal toward zero; and adjusting the phase of the second reference signal with a second phase servo electronics module to drive the fourth demodulated signal toward zero.

Example 13 includes the method of Example 12, wherein the second modulation signal is a second harmonic frequency of the first modulation signal plus a delta-f frequency.

Example 14 includes the method of Example 13, further comprising multiplying the first modulation signal and the second modulation signal to produce a third reference signal at the delta-f frequency, wherein the third reference signal at the delta-f frequency is provided to a third demodulator; wherein detecting a reference phase error with at least the third demodulator comprises demodulating an output signal from a differencing function with the third demodulator in phase with the third reference signal and at the delta-f frequency to produce a third demodulated signal; and wherein adjusting the phase of at least one of the first reference signal and the second reference signal comprises adjusting the phase of the first reference signal with a first phase servo electronics module to drive the third demodulated signal toward zero.

Example 15 includes the method of any of Examples 13-14, further comprising multiplying the first modulation signal and the second modulation signal to produce a third reference signal at the delta-f frequency, wherein the third reference signal at the delta-f frequency is provided to a third demodulator and a fourth demodulator; wherein detecting a reference phase error with at least the third demodulator comprises: demodulating the first demodulated signal with the third demodulator in phase with the third reference signal and at the delta-f frequency to produce a third demodulated signal; demodulating the second demodulated signal with the fourth demodulator in phase with the third reference signal and at the delta-f frequency to a produce a fourth demodulated signal; and wherein adjusting the phase of at least one of the first reference signal and the second reference signal comprises: adjusting the phase of the first reference signal with a first phase servo electronics module to drive the third demodulated signal toward zero; and adjusting the phase of the second reference signal with a second phase servo electronics module to drive the fourth demodulated signal toward zero.

Example 16 includes the method of any of Examples 11-15, further comprising: locking a phase of the first slave laser to a phase of the master laser using first optical phase lock loop (OPLL) electronics; and locking a phase of the second slave laser to the master laser using second OPLL electronics.

Example 17 includes a resonance tracking circuit for a resonator fiber optic gyroscope, comprising: a first demodulator configured to demodulate a first signal in phase with a first reference signal and at the first frequency to produce a first demodulated signal, wherein the first signal corresponds to a first optical signal; a second demodulator configured to demodulate a second signal in phase with a second reference signal and at the first frequency to produce a second demodulated signal, wherein the second signal corresponds to a second optical signal, wherein the first reference phase and the second reference phase are derived from a first modulation signal injected on both the first optical signal and the second optical signal, wherein a second modulation signal is injected on both the first optical signal and the second optical signal; a differencing function configured to output the difference between resonance frequencies of the first signal and the second signal based on the first demodulated signal and the second demodulated signal; at least a third demodulator configured to detect a reference phase error; and one or more phase servo electronics modules configured to adjust the phase of at least one of the first reference signal and the second reference signal based on the detected reference phase error.

Example 18 includes the resonance tracking circuit of Example 17, wherein the first demodulator is a dual-phase demodulator having an in-phase output and a quadrature output; wherein the second demodulator is a dual-phase demodulator having an in-phase output and a quadrature output; wherein the at least a third demodulator includes: a third demodulator configured to demodulate a quadrature signal from the quadrature output of the first demodulator in phase with the second modulation signal to produce a third demodulated signal; and a fourth demodulator configured to demodulate a quadrature signal from the quadrature output of second demodulator in phase with the second modulation signal to produce a fourth demodulated signal; wherein the one or more phase servo electronics modules include: a first phase servo electronics module is coupled to the third demodulator, wherein the first phase servo electronics module adjusts the phase of the first reference signal to drive the third demodulation signal toward zero; and a second phase servo electronics module coupled to the fourth demodulator, wherein the second phase servo electronics module adjusts the phase of the second reference signal to drive the fourth demodulation signal toward zero.

Example 19 includes the resonance tracking circuit of any of Examples 17-18, wherein the second modulation signal is a second harmonic frequency of the first modulation signal plus a delta-f frequency; the RFOG further comprising a mixer configured to multiply the first modulation signal with the second modulation signal to produce a third reference signal at the delta-f frequency; and wherein the at least a third demodulator includes a third demodulator configured to demodulate a signal output from the differencing function in phase with the third reference signal and at the delta-f frequency to produce a third demodulated signal; and wherein the one or more phase servo electronics modules include a first phase servo electronics module coupled to the third demodulator, wherein the first phase servo electronics module adjusts the phase of the first reference signal to drive the third demodulated signal toward zero.

Example 20 includes the resonance tracking circuit of any of Examples 17-19, wherein the second modulation signal is a second harmonic frequency of the first modulation signal plus a delta-f frequency; the RFOG further comprising a mixer configured to multiply the first modulation signal and the second modulation signal to produce a third reference signal at the delta-f frequency; wherein the at least a third demodulator comprises: a third demodulator configured to demodulate the first demodulated signal in phase with the second modulation signal and at the delta-f frequency to produce a third demodulated signal; and a fourth demodulator configured to demodulate the second demodulated signal in phase with the third reference signal and at the delta-f frequency to produce a fourth demodulated signal; wherein the one or more phase servo electronics modules include: a first phase servo electronics module coupled to the third demodulator, wherein the first phase servo electronics module adjusts the phase of the first reference signal to drive the third demodulated signal toward zero; and a second phase servo electronics module coupled to the fourth demodulator, wherein the second phase servo electronics module adjusts the phase of the second reference signal to drive the fourth demodulated signal toward zero.

In various embodiments, system elements, method steps, or examples described throughout this disclosure may be implemented on one or more computer systems, field programmable gate array (FPGA), application-specific integrated circuit (ASIC) or similar devices comprising a processor and memory hardware executing code to realize those elements, processes, or examples, said code stored on a non-transient data storage device. Therefore other embodiments of the present disclosure may include such a processor and memory hardware as well as elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber optic gyroscope (RFOG), comprising:
a master laser configured to emit a reference optical signal;
a first slave laser configured to emit a first optical signal;
a second slave laser configured to emit a second optical signal;
an optical resonator ring cavity coupled to the master laser, first slave laser, and second slave laser, wherein the first optical signal propagates in a first direction through the optical resonator ring cavity, and the second optical signal propagates in a second direction through the optical resonator ring cavity;
one or more signal generators configured to inject a first modulation signal at a first frequency and second modulation signal at a second frequency on both the first optical signal and the second optical signal;
a first photodetector that generates a first signal corresponding to the first optical signal based on a signal exiting the optical resonator ring cavity at a first transmission port;
a second photodetector that generates a second signal corresponding to the second optical signal based on a signal exiting the optical resonator ring cavity at a second transmission port;
a first demodulator configured to demodulate the first signal in phase with a first reference signal and at the first frequency to produce a first demodulated signal;
a second demodulator configured to demodulate the second signal in phase with a second reference signal and at the first frequency to produce a second demodulated signal, wherein the first reference signal and the second reference signal are derived from the first modulation signal;
a differencing function configured to output the difference between resonance frequencies of the first signal and the second signal based on the first demodulated signal and the second demodulated signal;
at least a third demodulator configured to detect a reference phase error; and
at least one phase servo electronics module configured to adjust the phase of at least one of the first reference signal and the second reference signal based on the detected reference phase error.

2. The RFOG of claim 1, further comprising first optical phase lock loop (OPLL) electronics coupled to the first slave laser and second OPLL electronics coupled to the second slave laser, wherein the first slave laser is phase-locked to the master laser using the first OPLL electronics and the second slave laser is phase-locked to the master laser using the second OPLL electronics.

3. The RFOG of claim 2, further comprising:
a first servo electronics module coupled to the first demodulator, wherein the first servo electronics module controls an output of a first direct digital synthesizer (DDS) that provides a local oscillator signal for the first OPLL electronics; and
a second servo electronics module coupled to the second demodulator, wherein the second servo electronics module controls an output of a second DDS that provides a local oscillator signal for the second OPLL electronics.

4. The RFOG of claim 3, further comprising:
a third photodetector coupled to a reflection port of the resonator; and
Pound-Drever-Hall (PDH) electronics coupled to the third photodetector and the master laser, wherein the PDH electronics receive the second modulation signal, wherein the second modulation signal comprises a PDH set-point modulation signal, wherein the PDH electronics applies the PDH set-point modulation signal to the reference optical signal, wherein the PDH set-point modulation signal modulates the reference optical signal at the second frequency.

5. The RFOG of claim 4, wherein the second frequency is outside of a measurement band of the RFOG.

6. The RFOG of claim 4, wherein the first demodulator is a dual-phase demodulator having an in-phase output and a quadrature output, wherein the second demodulator is a dual-phase demodulator having an in-phase output and a quadrature output.

7. The RFOG of claim 6, wherein the at least a third demodulator comprises:
   a third demodulator configured to demodulate a quadrature signal from the quadrature output of the first demodulator at the second frequency to produce a third demodulated signal, wherein the third demodulated signal corresponds to a phase error of the first reference signal; and
   a fourth demodulator configured to demodulate a quadrature signal from the quadrature output of second demodulator at the second frequency to produce a fourth demodulated signal, wherein the fourth demodulated signal corresponds to a phase error of the second reference signal;
   wherein the at least one phase servo electronics module comprises:
   a first phase servo electronics module coupled to the third demodulator, wherein the first phase servo electronics module adjusts the phase of the first reference signal to drive the third demodulated signal toward zero; and
   a second phase servo electronics module coupled to the fourth demodulator, wherein the second phase servo electronics module adjusts the phase of the second reference signal to drive the fourth demodulated signal toward zero.

8. The RFOG of claim 3, wherein the second modulation signal comprises a second harmonic frequency of the first modulation signal plus a delta-f frequency, wherein the second modulation signal is summed with the first modulation signal prior to being injected on the first optical signal and the second optical signal.

9. The RFOG of claim 8, further comprising a mixer configured to multiply the first modulation signal with the second modulation signal to produce a third reference signal at the delta-f frequency;
   wherein the at least a third demodulator comprises a third demodulator configured to demodulate a signal output from the differencing function in phase with the third reference signal and at the delta-f frequency to produce a third demodulated signal, wherein the third demodulated signal corresponds to a phase error of the first reference signal; and
   wherein the at least one phase servo electronics module comprises a first phase servo electronics module coupled to the third demodulator, wherein the first phase servo electronics module adjusts the phase of the first reference signal to drive the third demodulated signal toward zero.

10. The RFOG of claim 8, further comprising a mixer configured to multiply the first modulation signal and the second modulation signal to produce a third reference signal at the delta-f frequency;
    wherein the at least a third demodulator comprises:
    a third demodulator configured to demodulate the first demodulated signal in phase with the third reference signal and at the delta-f frequency to produce a third demodulated signal, wherein the third demodulated signal corresponds to a phase error of the first reference signal; and
    a fourth demodulator configured to demodulate the second demodulated signal in phase with the third reference signal and at the delta-f frequency to produce a fourth demodulated signal, wherein the fourth demodulated signal corresponds to a phase error of the second reference signal;
    wherein the at least one phase servo electronics module comprises:
    a first phase servo electronics module coupled to the third demodulator, wherein the first phase servo electronics module adjusts the phase of the first reference signal to drive the third demodulated signal toward zero; and
    a second phase servo electronics module coupled to the fourth demodulator, wherein the second phase servo electronics module adjusts the phase of the second reference signal to drive the fourth demodulated signal toward zero.

11. A method of reducing common modulation errors for a resonator fiber optic gyroscope (RFOG) during operation, comprising:
    injecting a first modulation signal at a first frequency and second modulation signal at a second frequency on both the first optical signal and the second optical signal, wherein the first optical signal propagates in a first direction through an optical resonator ring cavity, and the second optical signal propagates in a second direction through the optical resonator ring cavity;
    demodulating a first signal corresponding to the first optical signal in phase with a first reference signal and at the first frequency with a first demodulator to produce a first demodulated signal;
    demodulating a second signal corresponding to the second optical in phase with a second reference signal and at the second frequency with a second demodulator to produce a second demodulated signal, wherein the first reference signal and the second reference signal are derived from the first modulation signal;
    detecting a reference phase error with at least a third demodulator;
    adjusting the phase of at least one of the first reference signal and the second reference signal to drive the detected reference phase error toward zero.

12. The method of claim 11, wherein detecting a reference phase error with at least the third demodulator comprises:
    demodulating a quadrature signal from a quadrature output of the first demodulator with a third demodulator in phase with the second modulation signal and at the second frequency to produce a third demodulated signal; and
    demodulating a quadrature signal from a quadrature output of the second demodulator with a fourth demodulator in phase with the second modulation signal and at the second frequency to produce a fourth demodulated signal;
    wherein adjusting the phase of at least one of the first reference signal and the second reference signal comprises:

adjusting the phase of the first reference signal with a first phase servo electronics module to drive the third demodulated signal toward zero; and adjusting the phase of the second reference signal with a second phase servo electronics module to drive the fourth demodulated signal toward zero.

13. The method of claim 12, wherein the second modulation signal is a second harmonic frequency of the first modulation signal plus a delta-f frequency.

14. The method of claim 13, further comprising multiplying the first modulation signal and the second modulation signal to produce a third reference signal at the delta-f frequency, wherein the third reference signal at the delta-f frequency is provided to a third demodulator;

wherein detecting a reference phase error with at least the third demodulator comprises demodulating an output signal from a differencing function with the third demodulator in phase with the third reference signal and at the delta-f frequency to produce a third demodulated signal; and wherein adjusting the phase of at least one of the first reference signal and the second reference signal comprises adjusting the phase of the first reference signal with a first phase servo electronics module to drive the third demodulated signal toward zero.

15. The method of claim 13, further comprising multiplying the first modulation signal and the second modulation signal to produce a third reference signal at the delta-f frequency, wherein the third reference signal at the delta-f frequency is provided to a third demodulator and a fourth demodulator;

wherein detecting a reference phase error with at least the third demodulator comprises:

demodulating the first demodulated signal with the third demodulator in phase with the third reference signal and at the delta-f frequency to produce a third demodulated signal;

demodulating the second demodulated signal with the fourth demodulator in phase with the third reference signal and at the delta-f frequency to a produce a fourth demodulated signal; and wherein adjusting the phase of at least one of the first reference signal and the second reference signal comprises:

adjusting the phase of the first reference signal with a first phase servo electronics module to drive the third demodulated signal toward zero; and adjusting the phase of the second reference signal with a second phase servo electronics module to drive the fourth demodulated signal toward zero.

16. The method of claim 11, further comprising:

locking a phase of the first slave laser to a phase of the master laser using first optical phase lock loop (OPLL) electronics; and locking a phase of the second slave laser to the master laser using second OPLL electronics.

17. A resonance tracking circuit for a resonator fiber optic gyroscope, comprising:

a first demodulator configured to demodulate a first signal in phase with a first reference signal and at the first frequency to produce a first demodulated signal, wherein the first signal corresponds to a first optical signal;

a second demodulator configured to demodulate a second signal in phase with a second reference signal and at the first frequency to produce a second demodulated signal, wherein the second signal corresponds to a second optical signal, wherein the first reference phase and the second reference phase are derived from a first modulation signal injected on both the first optical signal and the second optical signal, wherein a second modulation signal is injected on both the first optical signal and the second optical signal;

a differencing function configured to output the difference between resonance frequencies of the first signal and the second signal based on the first demodulated signal and the second demodulated signal;

at least a third demodulator configured to detect a reference phase error; and one or more phase servo electronics modules configured to adjust the phase of at least one of the first reference signal and the second reference signal based on the detected reference phase error.

18. The resonance tracking circuit of claim 17, wherein the first demodulator is a dual-phase demodulator having an in-phase output and a quadrature output;

wherein the second demodulator is a dual-phase demodulator having an in-phase output and a quadrature output;

wherein the at least a third demodulator includes:

a third demodulator configured to demodulate a quadrature signal from the quadrature output of the first demodulator in phase with the second modulation signal to produce a third demodulated signal; and a fourth demodulator configured to demodulate a quadrature signal from the quadrature output of second demodulator in phase with the second modulation signal to produce a fourth demodulated signal;

wherein the one or more phase servo electronics modules include:

a first phase servo electronics module is coupled to the third demodulator, wherein the first phase servo electronics module adjusts the phase of the first reference signal to drive the third demodulation signal toward zero; and a second phase servo electronics module coupled to the fourth demodulator, wherein the second phase servo electronics module adjusts the phase of the second reference signal to drive the fourth demodulation signal toward zero.

19. The resonance tracking circuit of claim 17, wherein the second modulation signal is a second harmonic frequency of the first modulation signal plus a delta-f frequency;

the RFOG further comprising a mixer configured to multiply the first modulation signal with the second modulation signal to produce a third reference signal at the delta-f frequency; and wherein the at least a third demodulator includes a third demodulator configured to demodulate a signal output from the differencing function in phase with the third reference signal and at the delta-f frequency to produce a third demodulated signal; and wherein the one or more phase servo electronics modules include a first phase servo electronics module coupled to the third demodulator, wherein the first phase servo electronics module adjusts the phase of the first reference signal to drive the third demodulated signal toward zero.

20. The resonance tracking circuit of claim 17, wherein the second modulation signal is a second harmonic frequency of the first modulation signal plus a delta-f frequency;

the RFOG further comprising a mixer configured to multiply the first modulation signal and the second modulation signal to produce a third reference signal at the delta-f frequency;

wherein the at least a third demodulator comprises:

a third demodulator configured to demodulate the first demodulated signal in phase with the second modulation signal and at the delta-f frequency to produce a third demodulated signal; and a fourth demodulator configured to demodulate the second demodulated signal in phase with the third reference signal and at the delta-f frequency to produce a fourth demodulated signal;

wherein the one or more phase servo electronics modules include:

a first phase servo electronics module coupled to the third demodulator, wherein the first phase servo electronics module adjusts the phase of the first reference signal to drive the third demodulated signal toward zero; and a second phase servo electronics module coupled to the fourth demodulator, wherein the second phase servo electronics module adjusts the phase of the second reference signal to drive the fourth demodulated signal toward zero.

* * * * *